United States Patent
Reynolds et al.

[11] 3,724,469
[45] Apr. 3, 1973

[54] TOBACCO SMOKE FILTER

[75] Inventors: Jefferson W. Reynolds; Cephas H. Sloan, both of Kingsport, Tenn.

[73] Assignee: Eastman Kodak Company, Rochester, N.Y.

[22] Filed: Sept. 23, 1971

[21] Appl. No.: 183,223

[52] U.S. Cl. ................131/266, 131/262, 131/10.7
[51] Int. Cl. ..............................................A24b 15/02
[58] Field of Search...260/566 R; 252/431; 131/10.7, 131/266, 262, 263, 264, 265, 269

[56] References Cited

UNITED STATES PATENTS

| | | | |
|---|---|---|---|
| 3,280,823 | 10/1966 | Bavley et al. | 131/262 A |
| 3,319,635 | 5/1967 | Stahly | 13/262 R |
| 3,460,543 | 8/1969 | Keith et al. | 131/266 X |
| 2,815,730 | 12/1957 | Schreus et al. | 131/262 A |

Primary Examiner—Melvin D. Rein
Attorney—Cecil D. Quillen, Jr.

[57] ABSTRACT

Disclosed are cigarette filters containing compositions of certain cobalt or iron chelates adsorbed or supported on the surface of a suitable particulate support such as activated carbon particles. These cigarette filters remove substantial quantities of nitrogen oxides from cigarette smoke. Chelates suitable for use in this invention are of iron or cobalt and an organic compound containing a

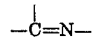

group and a functional group capable of forming a bond with the iron or cobalt atom. In a first embodiment of the cigarette filter aspect of the invention the cigarette filter can comprise a cylinder of crimped, continuous, plasticized cellulose acetate fibers, and the activated carbon particles, having the chelate adsorbed or supported on the surface thereof, are bonded to the cellulose acetate fibers. In a second embodiment of the cigarette filter aspect of the invention the cigarette filter can comprise a first cylinder of crimped, continuous, plasticized cellulose acetate fiber, and coaxially positioned with respect to the first cylinder, a second cylinder of a composition comprising the activated carbon particles having the chelate adsorbed or supported on the surface thereof. In the composition aspect of the invention the composition comprises the material used to prepare the second cylinder. In one aspect of this invention the functional group capable of forming a bond with the iron or cobalt atom can be —OH or

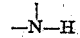

The chelate of cobalt and the condensation product of salicylaldehyde and ethylene diamine is a particularly desirable chelate for use in this invention. Polyethylene glycol diacetate is a particularly desirable plasticizer for the cellulose acetate fibers because it can also be used for bonding the activated carbon particles to the cellulose acetate fibers.

5 Claims, No Drawings

TOBACCO SMOKE FILTER

This invention relates to the selective removal of nitrogen oxides from cigarette smoke by means of a filter comprising a suitable particulate support, such as activated carbon particles and, adsorbed or supported on the surface of the particles, a chelate of iron or cobalt and an organic compound containing

group and a functional group capable of forming a bond between the iron or cobalt atom.

Cigarette smoke filters that remove nitrogen oxides from cigarette smoke are reported in U.S. Pat. Nos. 3,327,718; 3,407,820 and 3,434,479.

The irreversible reaction between nitric oxide and N,N'-ethylenebis(salicylideneiminato) cobalt as well as other Schiff-base complexes of cobalt are described in the following references: (1) F. Rallo and P. Silvestroni, Ricerca Sci. Rend., Sez. A 3 (7), 1001–6 (1963), Chem. Abstr., 60, 7668 (1964); (2) A. Earnshaw, P. C. Hewlett, and L. F. Larkworthy, J. Chem. Soc., 1965, 4718–23; and (3) H. Diehl and C. C. Hach, Inorganic Synthesis, 3, 196 (1950). No mention is made of the use of these cobalt chelates on a support such as activated carbon which allows an extremely fast reaction to occur between the complexes and these oxides of nitrogen.

Phthalocyanine complexes of iron and cobalt are cited in the literature as capable of reacting with the oxides of nitrogen in the following two references: (1) G. Sartori and E. Ercolani, Ric. Sci. Rend., Sez. A (3), 323–8 (1963); Chem. Abstr., 59, 10894 (1963) and (2) C. Ercolani, C. Neri and G. Sartori, J. Chem. Soc., A 1968, (9), 2123–7; Chem. Abstr., 69, 83082 (1968). Here again no mention is made of supporting the complexes or their use as a cigarette filter additive to selectively remove the oxides of nitrogen from cigarette smoke.

In broad summary this invention relates both to cigarette filters which remove substantial quantities of nitrogen oxides from cigarette smoke and also to compositions used in preparing these filters.

In a first embodiment of the cigarette filter aspect of the invention the cigarette filter can comprise a cylinder of crimped, continuous, plasticized cellulose acetate fibers, and the adsorbent such as activated carbon particles, having a chelate adsorbed on the surface thereof, is bonded to the cellulose acetate fibers.

In a second embodiment of the cigarette filter aspect of the invention the cigarette filter can comprise a first cylinder of crimped, continuous, plasticized cellulose acetate fiber and coaxially positioned with respect to the first cylinder a second cylinder of a composition comprising the adsorbent such as activated carbon particles having the chelate adsorbed on the surface thereof.

In the composition aspect of this invention the composition comprises the material used to prepare the second cylinder in the second embodiment of the cigarette filter aspect of the invention.

An advantage of this invention is the removal of substantial quantities of nitrogen oxides from cigarette smoke.

Another advantage of this invention is the removal of substantial quantities of nitrogen oxide from cigarette smoke without reducing the ability of activated carbon particles to remove other undesirable components from cigarette smoke.

Other advantages and features of this invention will be readily apparent to those skilled in the art from the following description and appended claims.

In this disclosure the term "nitrogen oxide," and words of similar import, means a combination of gaseous NO and $NO_2$.

The chelate useful in this invention is a chelate of iron or cobalt and an organic compound containing a

group and a functional group capable of forming a chemical bond with the iron or cobalt atom. In one embodiment the functional group can be —OH or

The organic compound can be aliphatic or aromatic in character.

One particularly desirable chelate is the cobalt (II) chelate of the condensation product of salicylaldehyde and ethylenediamine. To prepare this chelate, sometimes called "salcomine," 2 moles of salicylaldehyde are condensed with one mole of ethylenediamine to produce the compound:

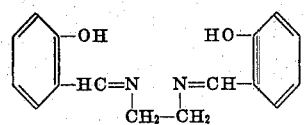

This compound is then reacted with a suitable salt of cobalt, such as cobalt chloride or cobalt acetate, to produce salcomine or N,N'-ethylenebis(salicylideneiminato) cobalt (II) corresponding to the structure

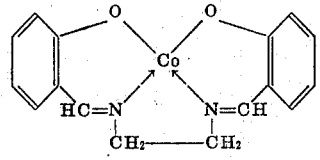

This method of preparing salcomine is well known in the literature such as H. Diehl and C. C. Hoch, Inorganic Synthesis, 3, 196–201 (1950).

Other iron and cobalt chelates suitable for use in this invention can be prepared according to procedures well known in the art. Examples of other chelates are:

1. Cobalt chelated with the reaction product of 5-chlorosalicylaldehyde and ethylenediamine gives N,N'-ethylenebis(5-chloro-2-forminidoylphenolato) cobalt.

2. Cobalt chelated with the reaction product of salicyladehyde and 1,2-propane diamine gives N,N'-propylene bis(o-formimidoylphenolato) cobalt.

3. Cobalt chelated with the reaction product of salicylaldehyde and o-phenylenediamine gives N,N'-o-phenylene bis(o-formimidoylphenolato) cobalt.

4. Cobalt chelated with the reaction product of salicylaldehyde and 3,3'-diaminodipropylamine gives N,N'-(2,2'-iminodiethylene) bis(o-formimidoylphenolato) cobalt in which there are three coordinate bonds to nitrogen atoms.

5. Cobalt chelated with the reaction product of acetylacetone and ethylene diamine gives the structure below which is N,N'-ethylene bis(3-acetimidoyl-2-propen-2-ato) cobalt.

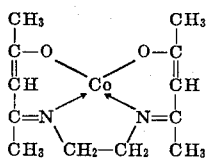

6. Cobalt chelated with phthalocyanine gave a compound of the structure

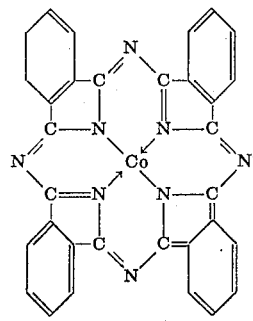

The activated carbon particles can have a U. S. Standard Sieve size of 14–50, an area of 500–1250 m²/gm and a pore volume of 0.5–9.5 ml/gm. In another aspect of the invention the activated carbon particles can have an area of 900–1200 m²/gm, and a pore volume of 0.6–0.95 ml/gm.

Examples of suitable activated carbons useful in this invention are:

1. National Carbon Co. Type CXC from Petroleum, >500 M.²/g. area, >0.6 ml./g. pore volume and 0.5 percent ash.
2. Pittsburgh Type BPL from bituminous coal, 1050–1150 M.²/g. area, 0.80 ml./g. pore volume and 2 percent ash.
3. Pittsburgh Type CAL from bituminous coal, 1000–1100 M.²/g. area, 0.94 ml./g. pore volume, and 8.5 percent ash.
4. Pittsburgh Type CPG from bituminous coal, 1000–1100 M.²/g. area, 0.90 ml./g. pore volume and 6.0 percent ash.
5. Pittsburgh Type OL from bituminous coal, 1000–1100 M.²/g. area, 0.81 ml./g. pore volume and 8 percent ash.
6. Pittsburgh Type SGL from bituminous coal, 950–1050 M.²/g., 0.85 ml./g. pore volume and 8 percent ash.
7. Pittsburgh Type PCB from coconut shells, 1150–1250 M.²/g. area, 0.72 ml./g. pore volume and 4 percent ash.

All of these activated carbons are completely permeated by systems of large macropores and appreciable concentrations of pores with <30 A diameters. Types CAL, CPG, OL and SGL have appreciable concentrations of pores with 30–1000 A diameters.

Other supports that can be used include:

1. Davision Grade 70 silica, 300 M.²/g. area and 1.22 ml./g. pore volume.
2. Alcoa Grade F-1 alumina, 210 M.²/g. area and about 0.4 ml./g. pore volume.
3. Harshaw Grade Al-0104 alumina, 90 M.²/g. area and about 0.4 ml./g. pore volume.
4. Iron III oxide prepared in the laboratory, about 250 M.²/g. area and 0.3 ml./g. pore volume.
5. Charles Loeb Pipes, Inc. meerschaum, 280 M.²/g. area and 1.4 ml./g. pore volume.
6. Rohm and Haas XAD-7, a polymethacrylate resin, about 30 mesh spheres, 400 M.²/g. area and about 0.6 ml./g. pore volume.

In the first embodiment of the cigarette filter aspect of this invention, the cigarette filter comprises a cylinder of crimped, continuous plasticized cellulose acetate fibers and the activated charcoal particles, having the chelate adsorbed on the surface thereof, are bonded to the cellulose acetate fibers. In this embodiment the activated carbon particles can be bonded to the cellulose acetate fibers by using plasticizers well known in the art. One particularly desirable plasticizer that can be used is polyethylene glycol diacetate wherein the polyethylene glycol has a molecular weight of 600–800.

Polyethylene glycol diacetate can be prepared by reacting acetic anhydride with polyethylene glycol, and distilling off the acetic acid. Polyethylene glycol diacetate is particularly desirable for use to bond the crimped, continuous cellulose acetate fibers into a firm cylindrical rod suitable for preparation into cigarette filters because the polyethylene glycol diacetate can also be used to bond the activated carbon particles to the cellulose acetate fiber. The polyethylene glycol diacetate is also desirable for use because in contrast to many other materials the polyethylene glycol diacetate does not substantially reduce the effectiveness of the activated charcoal to remove undesirable components other than nitrogen oxides from cigarette smoke. The polyethylene glycol diacetate can contain about 4 percent by weight cellulose acetate if desired.

In the first embodiment of the invention the activated carbon or other support having the chelate on the surface thereof can, according to methods well known in the art, be dusted or shaken onto a spread band of cellulose acetate cigarette filter tow which is then plasticized and further processed into a cylindrical rod of the same circumference as that of a cigarette. The filter rod can then be wrapped with paper and cut into any desired length. The finished filter can then be mounted on the cigarette according to conventional methods.

In a second embodiment of the cigarette filter aspect of the invention, the filter can comprise a first cylinder of crimped, continuous, plasticized cellulose acetate fiber and, coaxially positioned with respect to the first cylinder, a second cylinder of activated carbon particles having the chelate adsorbed on the surface thereof.

In a variation of this embodiment the filter can also comprise a third cylinder of plasticized cellulose acetate fibers, the third cylinder being coaxially positioned with respect to the first and second cylinders and disposed so as to position the second cylinder between the first and third cylinders.

According to this invention the cellulose acetate fibers can be from about 0.1–50 denier and have an acetyl content of 38–40. In one preferred embodiment 3.3 denier filaments of 39.8 percent acetyl content are used. Of course other filter elements such as baffles, paper, etc. can be used in conjunction with either the first or second embodiment of the cigarette filter aspect of the invention.

In the following examples selective filtration tests were conducted by using an automatic syringe-type smoking machine taking a 35 ml. puff of 2 sec. duration once each minute. Usually 10 puffs were required to reach the desired 27 mm. butt length of the used cigarette. Puffed cigarette smoke was first passed through a Cambridge (Type CM-113A) filter to remove tar and nicotine and then into an evacuated collection bottle containing reagent for the colormetric analysis of the oxides of nitrogen. [Saltzman, J. Anal. Chem. 26, 1949 (1951)]. Filter additives were tested in duplicate and compared with three control filters which contained nonactivated carbon.

EXAMPLE 1

The Type CXC carbon described above was used to prepare a filter additive containing 5 percent of salcomine. Two 0.2 ml. portions of the granular additive were tested in three-component acetate filters. To prepare the additive 6.21 g. of the carbon was impregnated with 0.33 g. of the cobalt compound in 12 ml. of chloroform. The mixture was stirred and evaporated at 25°C. to give dry-appearing granules which were treated several hours at 25°C. in a vacuum desiccator containing calcium chloride and 13X molecular sieve. The weight of the material was 6.78 g. and its bulk volume was 14.1 ml. Two cigarette filters were prepared as described above from 0.2 ml. (0.0962 g.) portions of the additive and attached to 65 mm. long tobacco columns. These cigarettes were machine-smoked to a 27 mm. butt length and the gas phase of the smoke was collected in an evacuated, one liter collection bottle containing 50 ml. of the reagent for colormetric analysis. Smoke from the two cigarettes contained an average of 224 µg. of NO—$NO_2$ compared to an average of 362 µg. for three controls with the same type of filter containing 0.2 ml. portions of nonactivated carbon. The supported cobalt chelate additive removed 38 percent of the NO—$NO_2$ from the smoke. Filters containing 100 mg. of untreated CXC carbon gave higher deliveries of NO—$NO_2$ than the control filter containing nonactivated carbon. This is believed to be caused by adsorption on the activated carbon of some smoke components which react with a portion of the NO—$NO_2$ to effectively remove it from the smoke. The smoke vapors pass through the nonactivated carbon essentially unchanged.

EXAMPLE 2

A band of cellulose acetate filter two (3.3-den./fil., 44,000 total denier) 12 inches in length was spread out and sprayed with glyceryl triacetate (bonding agent) so that it contained 8 percent by weight. Granules of the impregnated carbon additive (prepared as described in Example 1) were then applied uniformly to the spread-out tow until 31 percent additive had been added. The tow was drawn into a cylindrical mold of the same inside diameter as that of a cigarette and allowed to become firm. The cured filter rod was cut into 20 mm. segments for testing. Each 20 mm. segment contained an average of 0.1120 grams of additive.

Duplicate filters were attached to commercial cigarette columns, 65 mm. in length, and tested for their capacity to remove NO—$NO_2$ by the method referred to in Example 1. Filters removing no NO—$NO_2$ from cigarette smoke were used as controls. The amount of NO—$NO_2$ removed by the filter is shown below:

| Filter | µg. NO—$NO_2$ Del. Through Filter | % NO—$NO_2$ Removed From Cig. Smoke |
|---|---|---|
| Control | 351 | 0 |
| Filter Cont. Additive | 245 | 30 |

EXAMPLES 3–11

Activated carbons (CXC, BPL, PCB) described above were impregnated with salcomine from a chloroform solution, dried and tested in cigarette filters as described in Example 1.

The results are presented in Table 1.

TABLE 1

[NO—$NO_2$ removal by salcomine supported on activated carbon]

| Example number | Carbon type | Additive, g. (0.2 ml.) | Percent salco-mine | Micrograms NO—$NO_2$ in smoke Control | Micrograms NO—$NO_2$ in smoke Additive | Percent NO—$NO_2$ removed from smoke |
|---|---|---|---|---|---|---|
| 3 | CXC | .0965 | 10 | 303 | 214 | 29 |
| 4 | CXC | .0914 | 5 | 309 | 208 | 32 |
| 5 | CXC | .0922 | 2.5 | 352 | 302 | 14 |
| 6* | CXC | .1115 | 10 | 303 | 214 | 29 |
| 7 | BPL | .1006 | 5 | 352 | 265 | 25 |
| 8 | BPL | .1036 | 2.5 | 352 | 278 | 21 |
| 9** | CXC | .0965 | 10 | 345 | 260 | 25 |
| 10 | CXC | .0906 | 5 | 348 | 208 | 40 |
| 11 | PCB | .1245 | 5 | 354 | 289 | 18 |

*Additive was wet with 0.015 gram of water per 0.2 ml. additive.
**Additive stored 14 days on cigarette.

EXAMPLES 12–16

Additives containing 5 percent salcomine on certain of the activated carbons (2.07 g.) described above were prepared by impregnation with dimethylformamide (DMF) solutions (0.11 g. salcomine in 14 ml.). Most of the DMF was removed by evaporation and stirring at 70°C.; final treatment was at about 170°C. and 1 mm. Hg in a vacuum tube. Removal of NO—$NO_2$ in cigarette smoking tests as described in Example 1 is shown in Table 2. Filter construction is for 0.2 ml. of additive. Additive volumes of 0.1 and 0.4 ml. were placed in 2.5 and 10 mm. sections of the filters.

TABLE 2

[NO—$NO_2$ removal by salcomine supported on activated carbon]

| Example number | Carbon type | Additive, g. | Volume additive, ml. | Micrograms NO—$NO_2$ in smoke Control | Micrograms NO—$NO_2$ in smoke Additive | Percent NO—$NO_2$ removed from smoke |
|---|---|---|---|---|---|---|
| 12 | CXC | .0426 | 0.1 | 351 | 277 | 21 |
| 12 | CXC | .0851 | 0.2 | 355 | 195 | 44 |
| 12 | CXC | .1702 | 0.4 | 351 | 76 | 78 |
| 13 | CPG | .0468 | 0.1 | 353 | 276 | 22 |
| 13 | CPG | .0935 | 0.2 | 353 | 185 | 48 |
| 13 | CPG | .1870 | 0.4 | 353 | 48 | 86 |
| 14 | CAL | .0908 | 0.2 | 353 | 207 | 41 |
| 15 | OL | .0873 | 0.2 | 353 | 202 | 43 |
| 16 | SGL | .0960 | 0.2 | 353 | 231 | 35 |

EXAMPLES 17–22

Silica, alumina, iron III oxide, meerschaum and XAD-7 supports described above were used instead of carbon to support salcomine as described in Example 1. A different solvent, methylene chloride, was used instead of chloroform in Example 17. Results of smoking tests as described in Example 1 on 0.2 ml. of the additives (about 0.0044 g. salcomine per 0.2 ml.) are presented in Table 3.

TABLE 3

[NO—NO₂ Removal by salcomine on various supports]

| Example number | Support material | Additive, g. (0.2 ml.) | Percent salcomine on support | Micrograms NO—NO₂ in smoke Control | Micrograms NO—NO₂ in smoke Additive | Percent NO—NO₂ removed from smoke |
|---|---|---|---|---|---|---|
| 17 | Grade 70 silica | .1000 | 5.0 | 347 | 280 | 19.3 |
| 18 | Alumina, F-1 | .2025 | 2.3 | 350 | 268 | 24.0 |
| 19 | Alumina, Al-0104 | .2523 | 1.8 | 350 | 322 | 8.0 |
| 20 | Iron III oxide | .0695 | 6.6 | 350 | 317 | 9.2 |
| 21 | Meerschaum | .1798 | 2.4 | 350 | 325 | 6.9 |
| 22 | XAD-7 resin | .0914 | 5.0 | 309 | 280 | 9.0 |

EXAMPLES 23–27

Salcomine or salcomine-type chelates (5 percent) were supported on Type CPG activated carbon as described in Example 1. The results of NO—NO₂ removal from cigarette smoke in tests similar to those described in Example 1 are shown in Table 4.

TABLE 4

REMOVAL OF NO—NO₂ FROM CIGARETTE SMOKE BY SUPPORTED COBALT CHELATES

| Example Number * | Grams per 0.2 ml. | Micrograms NO—NO₂ in smoke Control | Micrograms NO—NO₂ in smoke Additive | Percent NO—NO₂ Removed From Smoke |
|---|---|---|---|---|
| 23 | 0.1169 | 354 | 200 | 44 |
| 24 | 0.1187 | 354 | 283 | 20 |
| 25 | 0.1195 | 354 | 255 | 28 |
| 26 | 0.1156 | 354 | 280 | 21 |
| 27 | 0.1165 | 354 | 296 | 16 |

*23 — salcomine
24 — 5-chlorosalcomine
25 — cobalt II, 1,2-propanediamine, salicylaldehyde
26 — cobalt II, o-phenylenediamine, salicylaldehyde
27 — cobalt II, 3,3-diaminodipropylamine, salicylaldehyde

EXAMPLE 28

A filter additive, prepared from 2.07 g. of Type CXC activated carbon and 0.11 g. of salcomine (5 percent, calculated), was tested for removal of NO—NO₂ from cigarette smoke as described in Example 1. A quantity of 0.0843 g. of cobalt acetate tetrahydrate was reacted with 0.0999 g. of N,N'-disalicylalethylene diamine in 5 ml. of chloroform over a period of 0.5 hr. to give a dark brown solution which was used to impregnate the carbon. After removal of the chloroform as described in Example 1, smoking tests showed that 0.2 ml. (0.0951 g.) of the additive in a filter removed 14 percent of the NO—NO₂ from cigarette smoke. The NO—NO₂ delivery was 298 μg. compared to 347 μg. for the control.

EXAMPLE 29

A filter additive containing 5 percent salcomine (calculated) on CXC activated carbon was prepared in a two-step impregnation process. A quantity of 2.07 g. of the carbon was impregnated with a solution of 0.0843 g. of cobalt acetate tetrahydrate dissolved in 3 ml. of distilled water. All but 1 g. of the water was evaporated to give dry-appearing granules which were impregnated with 4 ml. of a buffered solution (2.15 g. sodium hydroxide and 0.10 g. sodium acetate per 100 ml. of water) containing 0.0908 g. of N,N'-disalicylalethylenediamine. After removal of the water by evaporation on a hot plate and in a vacuum desiccator over calcium chloride, 0.2 ml. (0.0901 g.) of the additive removed 10 percent of the NO—NO₂ from cigarette smoke in tests as described in Example 1. The NO—NO₂ delivery was 316 μg. compared to 351 μg. for the control.

EXAMPLE 30

Type CXC activated carbon containing 5 percent salcomine was prepared as described for Examples 12–16 except dry acetic acid was used in place of DMF as solvent for the salcomine. Tests on 0.2 ml. (0.0882 g.) of the additive as described in Example 1 showed that it removed 35 percent of the NO—NO₂ (228 μg. vs. 352 μg. for control) from cigarette smoke.

EXAMPLE 31

A filter additive (0.2 ml., 0.0957 g.), prepared from 2.07 g. of Type CPG carbon and 0.11 g. of the cobalt chelate (5 percent, calculated) with the acetylacetone-ethylene diamine Schiff base, removed 16 percent of the NO—NO₂ from cigarette smoke in tests as described in Example 1. Filters containing the additive delivered 298 μg. of NO—NO₂ vs. 357 μg. for the controls. A brown solution of the chelate, prepared by reacting 0.0974 g. of cobalt acetate tetrahydrate with 0.0877 g. of the Schiff's base in 4 ml. of warm water, was used to impregnate the carbon; water was removed by evaporation on a hot plate at <100°C.

EXAMPLE 32

A filter additive (0.2 ml., 0.0911 g.) containing 15 percent iron phthalocyanine on Type CXC carbon removed 8 percent of NO—NO₂ from cigarette smoke in tests as described in Example 1. Deliveries of NO—NO₂ were 302 μg. for the additives and 326 μg. for the controls. The additive was prepared by impregnation of 1.70 g. of the carbon with 0.30 g. of the chelate in 6 ml. of distilled pyridine. The pyridine was removed on a steam bath and in a vacuum desiccator containing Type 13X molecular sieve.

EXAMPLE 33

A filter additive (0.2 ml., 0.0980 g.) prepared in exactly the same way as the one described in Example 32 from 0.30 g. (15 percent) of cobalt phthalocyanine and 1.70 g. of Type CXC carbon removed 14 percent of the NO—NO₂ in similar smoking tests. Deliveries of NO—NO₂ were 280 μg. for the additive and 326 μg. for the controls.

EXAMPLE 34

Salcomine (0.30 g.) was dissolved in 10 ml. of chloroform. A portion of the solution was applied to a paper filter 20 mm. in length. The filter was weighed before applying the solution and weighed again after the solvent had evaporated. The percentage of salcomine deposited on the filter was 10 percent of the total weight of the filter. The filter was attached to a cigarette which was then smoked. The smoke vapors were analyzed for nitrogen oxides by the method referred to in Example 1. A duplicate filter was similarly analyzed. Control filters (untreated paper filters) 20 mm. in length, were attached to cigarettes and smoked. Vapors passing through the filters were analyzed for NO—NO₂. None of the NO—NO₂ was removed by the paper-supported salcomine filters. Smoke vapors passing through the treated filters contained 325 μg. NO—NO₂ and smoke vapors passing through the untreated controls contained 317 μg. NO—NO₂. These results and the examples above indicate that it is necessary to have a porous support with appreciable surface area for salcomine in order for it to react with NO—NO₂ to remove it from cigarette smoke.

The preferred method of preparation of the filter additive is by impregnation of a preformed support with a solution of the metal chelate and then removal of the solvent. Wet-mixing techniques might be useful in the preparation of the additive. Chloroform, methylene chloride, pyridine, water, acetic acid, and DMF were used successfully as solvents for the metal chelates; there are undoubtedly others. In fact, the solvent choice may be an extremely important factor in additive activity since the metal chelates crystalline form is believed to be influenced by the solvent. The metal chelate may be prepared in the solvent (Examples 28, 31) or in the support (Example 29).

EXAMPLE 35

Polyethylene glycol diacetate was prepared using the following procedure. Polyethylene glycol having a molecular weight of 600 (2800 g.) was placed in a 10-1. flask. Acetic anhydride (950 g.) was slowly added through a reflux condenser attached to the flask, and the temperature was brought to 140°C. This temperature was then maintained for 1 hour. The reflux condenser was then replaced with a distillation condenser. The acetic acid by-product and other impurities were removed from the polyethylene glycol diacetate by distillation. The material was cooled and then poured into an activated charcoal bed. It was allowed to slowly percolate through this bed in order to remove traces of color and minor impurities. A clear, colorless polyethylene glycol diacetate (approximately 3200 g.) was obtained after this treatment.

Cellulose acetate powder (39.5 percent acetyl) was dissolved in the polyethylene glycol diacetate. The final solution containing approximately 4 percent cellulose acetate by weight had a viscosity of about 500 centistokes at 25°C.

Filter rods consisting of cellulose acetate fibers, the bonding plasticizer described above, and activated carbon particles were prepared accordingly. A cellulose acetate tow consisting of 12,000 cellulose acetate fibers of 5 den./fil. and crimped to 15 crimps per inch was spread to a width of 15 in. and sprayed with polyethylene glycol diacetate (molecular weight about 720) containing 4 percent cellulose acetate. Charcoal granules having a suitable chelate adsorbed thereon were added to the moving tow which contained 8 percent of the plasticizer mixture, and it was immediately processed into 90 mm. filter rods. It was observed that very little charcoal fell from the moving filter tow during processing. Moreover, the completed rods retained the carbon, even when vigorous tapping was used in attempts to shake it from the rods.

The invention has been described in detail with particular reference to preferred embodiments thereof, but it will be understood that variations and modifications can be effected within the spirit and scope of the invention.

We claim:

1. A tobacco smoke filter comprising
   A. a first cylinder of crimped, continuous, plasticized cellulose acetate fiber,
   B. coaxially positioned with respect to the first cylinder, a second cylinder of activated carbon particles having a U. S. Standard Sieve size of 14-50, an area of 500-1250 m²/gm and a pore volume of 0.5-9.5 ml/gm and, adsorbed or supported on the surface thereof, a chelate of iron or cobalt and an organic compound containing a

group and a functional group capable of forming a chemical bond with the iron or cobalt atom.

2. The filter of claim 1 wherein
   the activated carbon particles have an area of 900-1200 m²/gm, and a pore volume of 0.6-0.05 ml/gm, and
   the functional group capable of forming a chemical bond with the iron or cobalt is —OH or

3. The filter of claim 2 wherein
   the chelate is of cobalt and an aromatic or aliphatic organic compound and the functional group is —OH.

4. The filter of claim 3 wherein
   the chelate is of cobalt and the condensation product of salicylaldehyde and ethylenediamine.

5. The filter of claim 4 further comprising
   a third cylinder of plasticized cellulose acetate fibers, the third cylinder being coaxially positioned with respect to the first and second cylinders and disposed so as to position the second cylinder between the first and third cylinders.